US 6,707,966 B1

(12) United States Patent
Cline et al.

(10) Patent No.: US 6,707,966 B1
(45) Date of Patent: Mar. 16, 2004

(54) TWISTED LONG-PERIOD FIBER GRATING AND METHOD FOR REDUCING POLARIZATION DEPENDENT LOSS AND SHIFTING WAVELENGTH OF A LONG-PERION FIBER GRATING

(75) Inventors: Jerrold A. Cline, Corning, NY (US); Glenn E. Kohnke, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/567,752

(22) Filed: May 10, 2000

(51) Int. Cl.[7] .................................................. G02B 6/34
(52) U.S. Cl. ......................................... 385/37; 385/31
(58) Field of Search ....................................... 385/37.31

(56) References Cited

U.S. PATENT DOCUMENTS

| 4,389,090 A | 6/1983 | LeFevre |
| 5,020,153 A | 5/1991 | Choa et al. |
| 5,546,481 A | 8/1996 | Meltz et al. |
| 5,694,501 A | 12/1997 | Alavie et al. |
| 5,805,751 A | 9/1998 | Kewitsch et al. |
| 5,809,184 A | 9/1998 | Doerr et al. |
| 5,844,927 A | 12/1998 | Kringlebotn |
| 5,857,043 A | 1/1999 | Cook et al. ................... 385/37 |
| 5,907,647 A | * 5/1999 | Eggleton et al. ............ 385/122 |
| 6,169,830 B1 | * 1/2001 | Kewitsch et al. ............. 385/37 |

OTHER PUBLICATIONS

Lin et al, "Corrugated long period fiber gratings as band-rejection filters", Mar. 2000, Inst. of Electro–Opt., pp. 20–22, vol. 1.*
Kim et al, "Birefringence reduction in long period gratings by the fiber–twist method", May, 2000, Cleo, pp. 576–577.*
C.Y. Lin & L.A. Wang, "Corrugated Long Period Fiber Gratings as Band–Rejection", Mar. 5–10, 2000, OFC 2000.

* cited by examiner

*Primary Examiner*—Ellen E. Kim
(74) *Attorney, Agent, or Firm*—Price Heneveld Cooper Dewitt & Litton

(57) ABSTRACT

A long-period fiber grating includes a fiber having a core surrounded by a cladding, and a plurality of refractive index variations periodically spaced along the longitudinal axis of a portion of the core of the fiber. The fiber is twisted throughout at least a portion of its length that includes the plurality of refractive index variations. By twisting the long-period fiber grating, polarization dependent loss is reduced by as much as 30 percent. Also, the peak wavelength of the light propagating through the long-period fiber grating that is coupled into the cladding of the fiber may be adjusted. The peak wavelength may be adjusted in as little as 0.1 nm increments by twisting the long-period fiber grating after the grating has been written and annealed.

17 Claims, 5 Drawing Sheets

TWISTED LONG-PERIOD FIBER GRATING AND METHOD FOR REDUCING POLARIZATION DEPENDENT LOSS AND SHIFTING WAVELENGTH OF A LONG-PERION FIBER GRATING

BACKGROUND OF THE INVENTION

1. Field of the Invention

The present invention generally relates to long-period fiber gratings and to methods for reducing polarization dependent loss of a long-period fiber grating and for shifting the peak wavelength of a long-period fiber grating. More specifically, the present invention relates to long-period fiber gratings designed for use as a gain-flattening filter with an optical amplifier.

2. Technical Background

Fiber optic networks transmit a plurality of optical signals of different wavelengths through a single fiber employing wavelength division multiplexing. Losses result in the decreasing of intensity of such optical signals as they propagate over significant distances. Thus, when transmitting optical signals through an optical fiber over long distances, the fiber is typically divided into spans, with in-line optical amplifiers positioned between the spans to periodically amplify the intensity of the transmitted optical signals. A typical span is, for example, 80 km in length. The in-line optical amplifiers commonly used for such purposes generally exhibit optical signal gains that are different for the different wavelengths of the transmitted optical signals. Thus, each time the transmitted optical signals are amplified by one of the in-line optical amplifiers, certain optical signals are amplified to a greater degree than other optical signals at different wavelengths. Accordingly, when many in-line amplifiers are used over a long distance, significant discrepancies between the intensities of the transmitted optical signals may exist.

To overcome this problem, gain-flattening filters have been developed that may be used with an amplifier to flatten the gain across the spectrum of optical signals that are transmitted through the amplifier. One such gain-flattening filter is a long-period fiber grating (LPG).

LPGs function to attenuate intensity levels of the optical signals transmitted through the LPG dependent upon the wavelength of the optical signals. Thus, for optical signals of a first wavelength, the LPG may attenuate the intensity of those optical signals to a greater or lesser degree than it may attenuate optical signals at other wavelengths. This selective attenuation is accomplished by coupling some of the light of the optical signals that is transmitted through the core of the fiber into the cladding of the fiber. Once this light is in the cladding of the fiber, it then dissipates through the fiber coating so that this light is permanently lost. The peak wavelength λ for which coupling occurs from the core mode to the cladding mode in an LPG is:

$$\lambda = (n_{eff}^{core} - n_{eff}^{clad})\Lambda$$

where $n_{eff}^{core}$ is the effective index of the core mode, $n_{eff}^{clad}$ is the effective index of the cladding mode, and $\Lambda$ is the grating period.

FIG. 1 shows the spectral characteristics for a typical LPG, which is represented on a dB scale. As shown in FIG. 1, the spectral characteristics have a generally Gaussian shape, with some ripples on the sides. When used in a gain-flattening filter, a plurality of such LPGs is provided in series each having differing peak wavelengths than the others. In such a structure, the spectral characteristics accumulate resulting in a relatively complicated loss spectrum that complements the spectral gain characteristics of the in-line amplifier with which the gain-flattening filter is utilized.

LPGs are exceptionally sensitive to variations in fiber properties including core radius and core and clad refractive index. Typically, small changes in these parameters manifest themselves as wavelength shifts of the grating loss peak. An additional complication is introduced by small asymmetries in the fiber geometry that lead to birefringence. In gain flattening filter applications, the peak wavelength of an LPG must be controlled within as little as 0.1 nm depending on the particular filter. This corresponds to an $n_{eff}$ difference on the order of $\sim 5 \times 10^{-7}$. It is extremely difficult to control the fiber parameters (refractive index profile and core dimensions) well enough to reproduce grating peak wavelengths to within 0.1 nm. There are additional inconsistencies in fiber photosensitivity that manifest themselves as a different wavelength shifts upon grating annealing. Typical variations in peak wavelengths are on the order of 1 nm or more. To obtain a reasonable yield of devices, it is therefore desirable to develop a method of tuning the grating wavelength after the writing and annealing processes.

Due to the extreme sensitivity of LPGs to fiber parameters, the effective index $n_{eff}^{clad}$ of the core mode changes significantly with polarization even in a relatively low birefringence fiber. This results in a peak wavelength shift of the LPG for different polarizations. Thus, optical signals polarized in one direction will be affected differently than optical signals polarized in a different direction when propagating through the LPG. This difference produces a polarization dependent loss (PDL), which is illustrated in FIG. 2 for a case in which the peak wavelength changes by 0.2 nm as a function of polarization in a typical grating. It should be noted that PDL is defined as a positive number and the graph in FIG. 2 plots the absolute value of the difference between a pair of shifted spectra.

Research has revealed that PDL in LPGs can vary over a tremendous range of less than 0.1 dB to more than about 1 dB, depending on the type of fiber and the type of filter. From FIG. 2, it is apparent that the PDL is proportional to dL/dλ, where L is the grating loss. This implies that filters that have sharp features are more susceptible to PDL. Therefore, there is also a need for a method for reducing PDL after the grating has been written in the fiber.

SUMMARY OF THE INVENTION

Accordingly, it is an aspect of the present invention to provide a method of reducing PDL in a LPG. It is also an aspect of the present invention to provide a method for adjusting the peak wavelength of the light propagating through a LPG that is coupled into the cladding of the fiber. Another aspect of the present invention is to provide an LPG that has a characteristic peak wavelength that may be adjusted after its manufacture and that has a reduced PDL.

To achieve these and other aspects and advantages, a method according to a first embodiment of the present invention that reduces PDL in an LPG comprises the step of twisting the LPG.

According to another embodiment of the present invention, a method is provided for adjusting the peak wavelength of light propagating through an LPG that is coupled into the cladding of the fiber, which comprises the step of twisting the LPG until the desired adjustment to the peak wavelength is obtained.

According to another embodiment of the present invention, a method for manufacturing an LPG is disclosed that comprises the steps of providing a fiber having a core surrounded by a cladding, the fiber having two ends and extending therebetween along a longitudinal axis, writing a long-period grating pattern onto a portion of the fiber, annealing the fiber, and twisting the fiber throughout at least the portion of its length that includes the long-period grating pattern.

According to another embodiment of the present invention, a long-period fiber grating comprises a fiber having a core surrounded by a cladding, the fiber having two ends extending therebetween along a longitudinal axis, and a plurality of refractive index variations periodically spaced along the longitudinal axis of a portion of the core of the fiber, wherein the fiber is twisted throughout at least a portion of its length that includes the plurality of refractive index variations.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
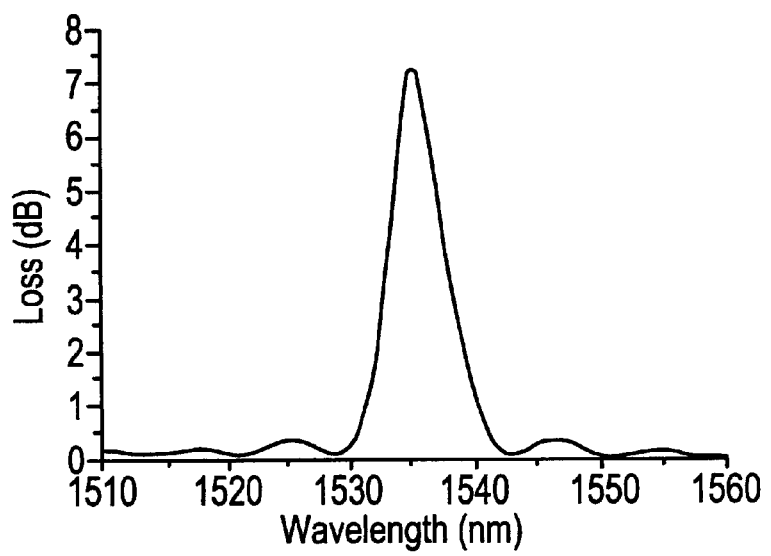
FIG. 1 is a graph of LPG loss as a function of wavelength for a conventional LPG.
Figure 2:
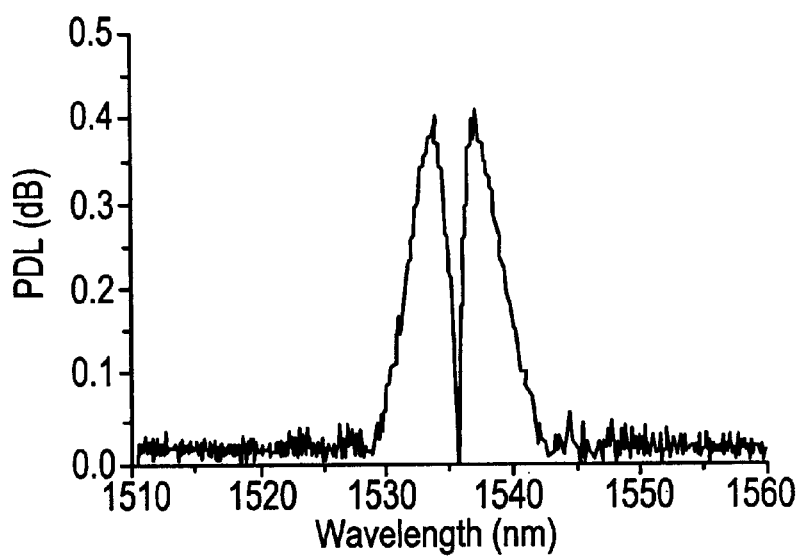
FIG. 2 is a graph of PDL as a function of wavelength in a conventional LPG.

Reference will now be made in detail to the present preferred embodiments of the invention, examples of which are illustrated in the accompanying drawings. Wherever possible, the same reference numerals will be used throughout the drawings to refer to the same or like parts.

Figure 3:
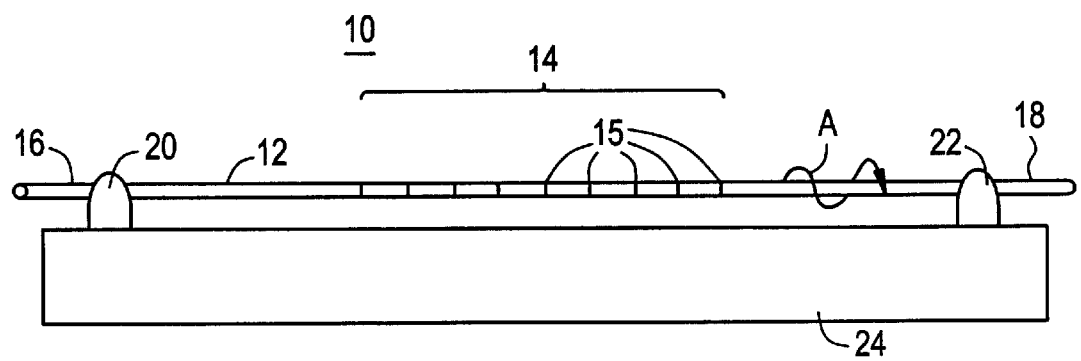
FIG. 3 is a side schematic view of an LPG constructed in accordance with the present invention.

FIG. 3 shows an LPG 10 constructed in accordance with the present invention. LPG 10 includes a fiber 12 having a fiber grating 14 formed in a portion thereof between ends 16 and 18 of fiber 12. Fiber grating 14 includes a plurality of refractive index variations 15 periodically spaced along the longitudinal axis of a portion of a core 30 (FIG. 4) of fiber 12. As shown in FIG. 3, fiber 12 is secured at locations on opposite sides of the grating 14, which in the illustrated embodiment are near both ends 16 and 18, to a substrate 24 via epoxy 20 and 22, respectively. Alternatively, other suitable attachment means such as a glass frit may be used. The substrate 24 may be a silica substrate, for example. In an alternative embodiment, the substrate may be in the form of a tube of silica or other material. The fiber 12 may be doped with $GeO_2$ and $B_2O_2$ to minimize spectral shifts due to temperature variation. Reference is made to U.S. patent application Ser. No. 08/989,200, filed on Dec. 11, 1997, now U.S. Pat. No. 6,201,918, which is incorporated herein by reference as if set forth in its entirety, for a more detailed description of athermalization in this manner.

Figure 4:
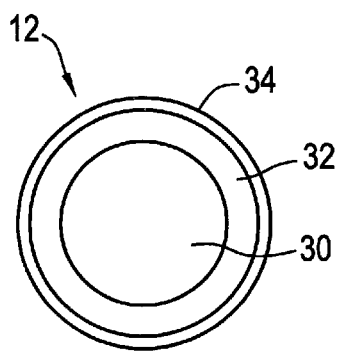
FIG. 4 is an enlarged cross section of a fiber that may be used in the LPG of the present invention.

As shown in FIG. 4, fiber 12 includes a central core 30, a cladding 32 surrounding core 30, and a coating 34 surrounding cladding 32. Such fiber structures are well known in the art and any conventional fiber may be used in LPG 10. Fiber grating 14 may be formed in fiber 12 in the same way as short-period gratings such as fiber Bragg gratings. Specifically, refractive index variations 15 in the core may be UV-induced index changes created with excimer laser or the like. Fiber grating 14 may also be formed by writing a long-period grating pattern into a portion of the fiber using a $CO_2$ laser since the periodicity of the grating is hundreds of microns. Thus, the fiber may be heated using the light from the $CO_2$ laser point by point so as to periodically perturb the fiber which causes melting or diffusing of dopants in the glass core. Additionally, electric arcs of the type used in fiber splicers may also be utilized to create the refractive index variations 15 that form the grating 14.

After the long-period grating pattern is written into a portion of the fiber, the fiber is then annealed, and one end 16 is secured to substrate 24 via a first epoxy deposit 20. Next, end 18 of the fiber is twisted as indicated by reference numeral A in FIG. 3 at least through a portion of fiber 12 that includes grating 14. Fiber 12 is then secured near end 18 by a second epoxy deposit 22 to therefore maintain the amount of twist between the epoxy deposits 20 and 22 and thus throughout the length of fiber grating 14. As used herein, the term "twisting" means rotating one end of the fiber about its longitudinal axis while holding the other end stationary. As explained in detail below, such twisting reduces PDL and also allows for the peak wavelength of LPG 10 to be adjusted after the grating pattern is written and the LPG is annealed.

By twisting the LPG, a circular birefringence is induced through the stress optic (or photoelastic) effect. The induced circular birefringence partially compensates for the linear fiber birefringence that is intrinsic in most fibers. As explained below, there is an optimum amount of twist for which the combination of linear and circular birefringence is minimized. Without twist, the linear birefringence dominates. With too much twist, the fiber becomes highly circular birefringent. Both of these extremes produce PDL. There exists an intermediate regime for which a reduction in birefringence, and therefore PDL, is observed. The twist also changes the refractive index of the cladding more than that of the core of the fiber. This produces a peak wavelength shift, since the cladding mode is affected differently than the core mode.

To ensure the fiber grating is tuned to the desired peak wavelength and that PDL is minimized, light may be injected into one end of the fiber and monitored at the other end as the fiber is twisted. Then, upon obtaining the appropriate amount of twist, the fiber may be secured near that other end.

Figure 5:
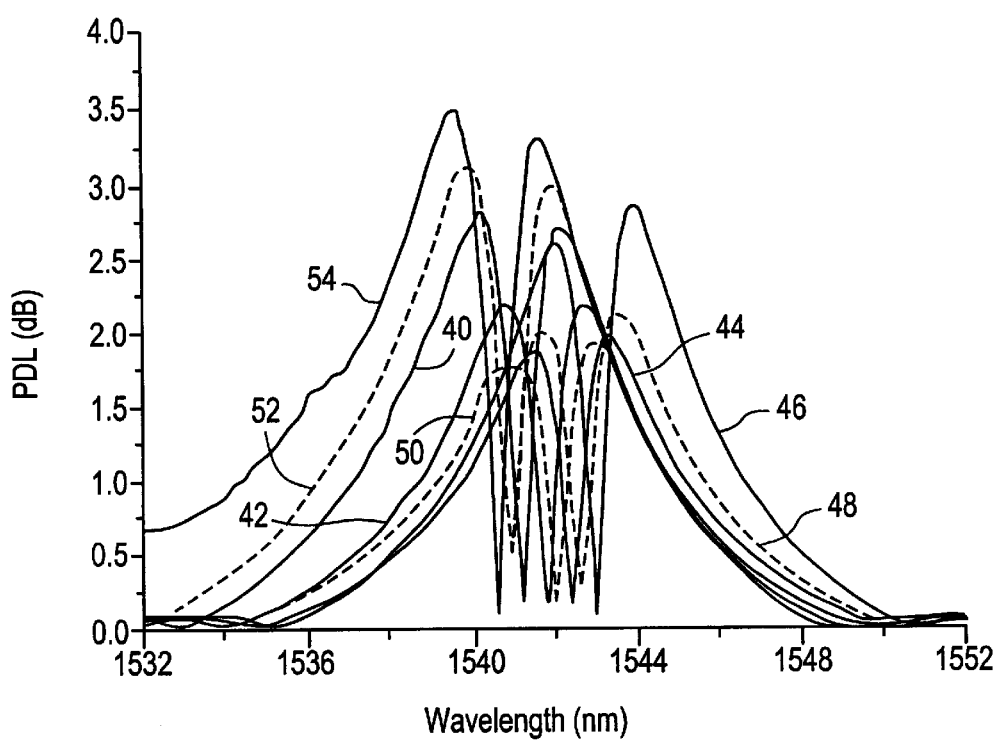
FIG. 5 is a graph of PDL as a function of wavelength in an LPG constructed in accordance with the present invention.
Figure 6:
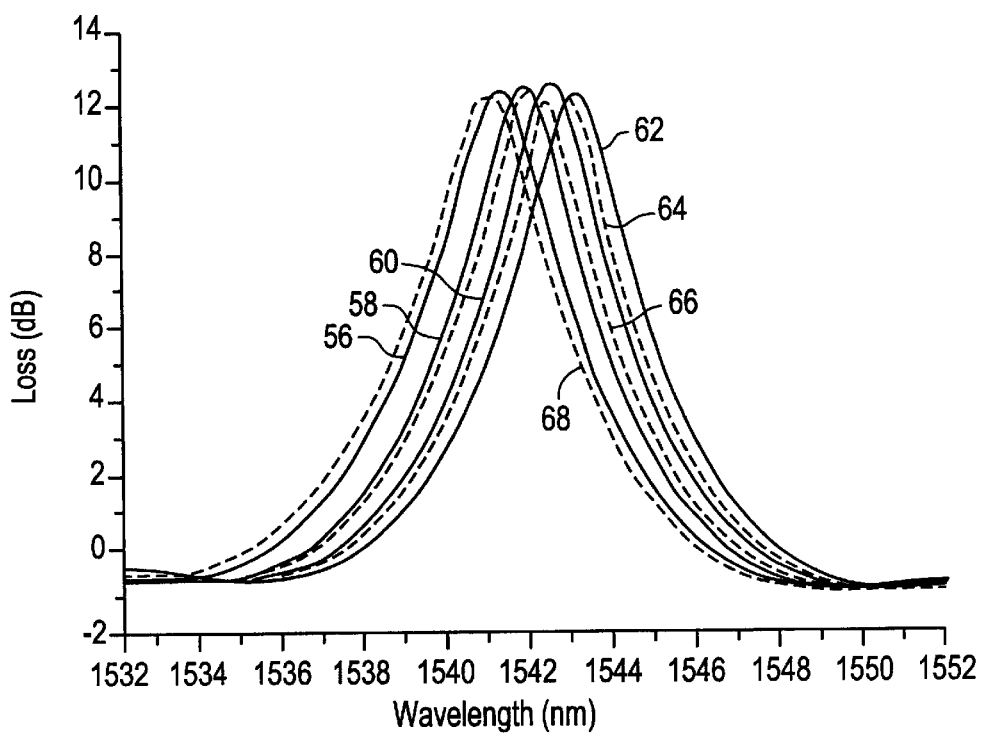
FIG. 6 is a graph of LPG loss as a function of wavelength for an LPG constructed in accordance with the present invention.

To validate these benefits of twisting the fiber, experiments were conducted using two LPGs. A first LPG exhibited extremely high PDL due to a large amount of core ellipticity, while a second LPG had a more typical value of PDL. PDL was measured with the fiber twisted over a length of approximately 9 cm of which the grating constituted 32 mm and 26 mm for the first and second LPGs, respectively. FIGS. 5 and 6 respectively show the PDL and loss spectrum for the first LPG as a function of the number of turns of clockwise (CW) and counterclockwise (CCW) twist. One "turn" of twist is a 360° rotation of one end of the fiber relative to its other end. Two turns is thus a 720° rotation. A turn in the clockwise direction is referenced as a positive rotation (e.g., +360°) while a turn in the counterclockwise direction is a negative rotation (e.g., −360°). The PDL initially decreases with increasing twist and subsequently increases. The peak wavelength exhibits a non-linear shift with increasing twist. In FIG. 5, curves 40, 42 and 44 are plots of PDL vs. wavelength for 3,2, and 1 clockwise turns, respectively; curves 46 is a plot for zero turns; and curves 48, 50, 52 and 54 are plots for 1,2,3, and 4 counter-clockwise turns, respectively.

In FIG. 6, curves 56, 58, and 60 are plots of loss vs. wavelength for 3, 2, and 1 clockwise turns; curve 62 is a plot for zero turns; and curves 64, 65 and 68 are plots for 1,2 and 3 counter-clockwise turns, respectively.

Figure 7:
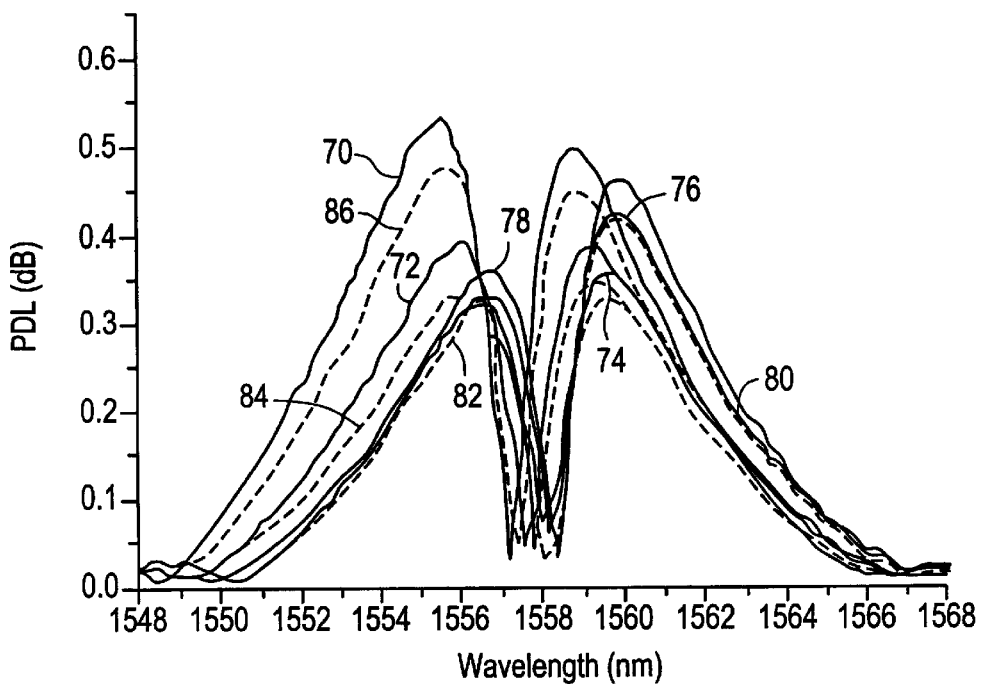
FIG. 7 is a graph of PDL as a function of wavelength in another LPG constructed in accordance with the present invention.
Figure 8:
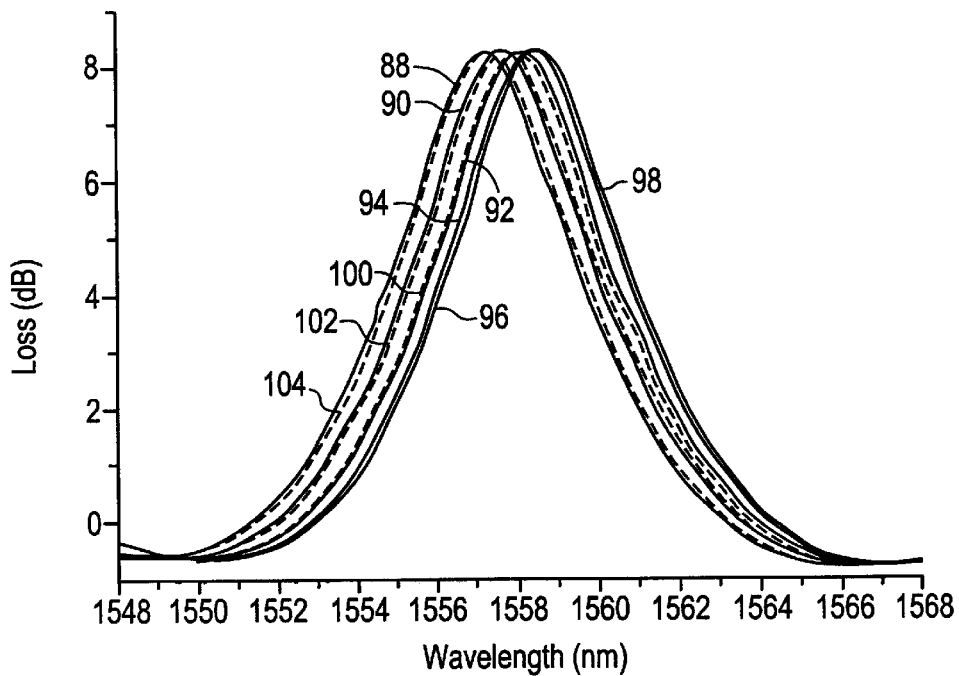
FIG. 8 is a graph of LPG loss as a function of wavelength for another LPG constructed in accordance with the present invention.
Figure 9:
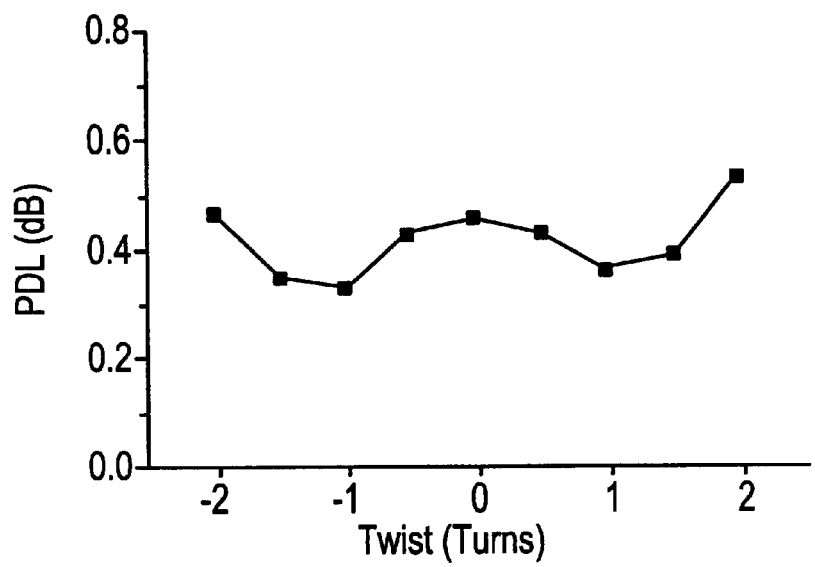
FIG. 9 is a graph of PDL as a function of twist of an LPG constructed in accordance with the present invention.
Figure 10:
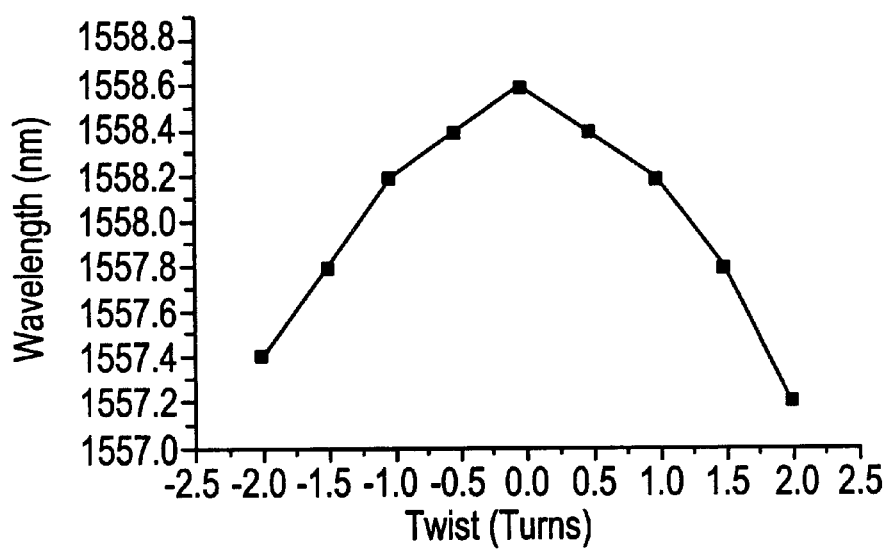
FIG. 10 is a graph of peak wavelength as a function of twist of an LPG constructed in accordance with the present invention.

FIGS. 7–10 summarize the results for the second LPG. FIGS. 7 and 8 illustrate the spectral behavior for the second LPG, which is qualitatively very similar to the results for the first LPG except on a different scale. Insert FIG. 7, curves 70, 72, 74, and 76 are plots of PDL vs. wavelength for 2, 1.5, 1 and 0.5 clockwise turns, respectively; cirve 78 is the plot for 0 turns; and curves 80, 82, 84 and 86 are plots for 0.5, 1, 1.5 and 2 counter-clockwise turns, respectively. In FIG. 8, curves 88, 90, 92 and 94 are plots of loss vs. wavelength for 2, 1.5, 1 and 0.5 clockwise turns, respectively; curve 96 is a plot for zero turns; and curves 98, 100, 102 and 104 are plots for 0.5, 1, 1.5 and 2 counterclockwise turns, respectively. In both cases, a PDL reduction of approximately 30 percent is observed. The PDL and wavelength shift is plotted as a function of twist in FIGS. 9 and 10. The ability to use a small amount of twist to induce a wavelength shift is an excellent way to reduce the peak wavelength variability that results from small changes in fiber properties. In this way, the peak wavelength can be tuned to the proper value during the packaging step in a manner analogous to the use of strain for fiber Bragg gratings. In addition, the twist could be used to tune a grating to custom match the variability of other components.

Thus, by twisting the LPG, not only may PDL be reduced by approximately 30 percent, but also the wavelength may be tuned to control the peak wavelength of the LPG within as little as 0.1 nm. The ability to adjust the peak wavelength after the grating has been written and annealed represents a very significant advantage since LPGs would otherwise be discarded if they did not meet the peak wavelength tolerances. Accordingly, the present invention offers a significant reduction in the manufacturing time and cost for LPGs.

Although the fiber grating has been described as being permanently secured at or near both ends by epoxy, glass frits or other suitable compositions, it will be appreciated by those skilled in the art that at least one end could be secured by a mechanism that can rotate and twist or untwist the fiber either manually or automatically. Such a mounting mechanism would permit dynamic active tuning of the fiber grating while monitoring its output.

It will become apparent to those skilled in the art that various modifications to the preferred embodiment of the invention as described herein can be made without departing from the spirit or scope of the invention as defined by the appended claims.

The invention claimed is:

1. A method of reducing polarization dependent loss in a long-period fiber grating, said method comprising the step of twisting the long-period fiber grating along its longitudinal axis.

2. The method of claim 1 and further including the steps of securing one end of the fiber to a substrate prior to twisting the fiber, and securing the other end of the fiber to the substrate after the fiber is twisted.

3. The method of claim 1 wherein the step of twisting the fiber includes the steps of injecting light into the fiber and monitoring the peak wavelength of the fiber as the fiber is twisted to determine the appropriate amount of twisting to obtain a desired peak wavelength of the light that is coupled into the cladding of the fiber.

4. The method of claim 1, wherein said fiber is twisted at least about 360 degrees about its longitudinal axis.

5. A method of adjusting the peak wavelength of the light in a long-period fiber grating that is coupled into the cladding of the fiber, said method comprising the step of twisting the long-period fiber grating along its longitudinal axis until predetermined adjustment to at least one peak wavelength is obtained.

6. The method of claim 5 and further including the steps of securing one end of the fiber to a substrate prior to twisting the fiber, and securing the other end of the fiber to the substrate after the fiber is twisted.

7. The method of claim 5 wherein the step of twisting the fiber includes the steps of injecting light into the fiber and monitoring the polarization dependent loss of the fiber as the fiber is twisted to determine the appropriate amount of twisting to obtain minimal polarization dependent loss.

8. The method of claim 5, wherein said fiber is twisted between about ±720 degrees about its longitudinal axis.

9. A method for manufacturing a long-period fiber grating comprising the steps of:
   providing a fiber having a core surrounded by a cladding;
   writing a long-period grating pattern into a section of the fiber;
   annealing the fiber; and
   twisting the fiber along its longitudinal axis throughout at least the section of its length that includes the long-period grating pattern.

10. The method of claim 9 and further including the steps of securing one end of the fiber to a substrate prior to twisting the fiber, and securing the other end of the fiber to the substrate after the fiber is twisted.

11. The method of claim 9 wherein the step of twisting the fiber includes the steps of injecting light into the fiber and monitoring the peak wavelength of the fiber as the fiber is twisted to determine the appropriate amount of twisting to obtain a desired peak wavelength of the light that is coupled into the cladding of the fiber.

12. The method of claim 9 wherein the step of twisting the fiber includes the steps of injecting light into the fiber and monitoring the polarization dependent loss of the fiber as the fiber is twisted to determine the appropriate amount of twisting to obtain minimal polarization dependent loss.

13. The method of claim 9, wherein said fiber is twisted between about ±720 degrees about its longitudinal axis.

14. A long-period fiber grating constructed using the method of claim 9.

15. A long-period fiber grating comprising:

a fiber having a core surrounded by a cladding, said fiber having two ends and extending therebetween along a longitudinal axis; and a plurality of refractive index variations periodically spaced along the longitudinal axis of a section of said core of said fiber, wherein said fiber is twisted along its longitudinal axis throughout at least the section of its length that includes said plurality of refractive index variations.

16. The long-period fiber grating of claim 15 and further including a substrate to which said fiber is attached.

17. The long-period fiber grating of claim 15, wherein said fiber is twisted between about ±720 degrees about its longitudinal axis.

* * * * *